Oct. 30, 1923.

J. R. BROWN 1,472,290

AIRTIGHT PIPE COUPLING

Filed Sept. 25, 1922

Joseph Rodney Brown, Inventor

Patented Oct. 30, 1923.

1,472,290

UNITED STATES PATENT OFFICE.

JOSEPH RODNEY BROWN, OF FRESNILLO, MEXICO.

AIRTIGHT PIPE COUPLING.

Application filed September 25, 1922. Serial No. 590,494.

*To all whom it may concern:*

Be it known that I, JOSEPH RODNEY BROWN, citizen of the United States of America, residing at Fresnillo, State of Zacatecas, Mexico, have invented certain new and useful Improvements in Airtight Pipe Couplings, of which the following is a specification.

This invention relates to an air tight connection for a tapered tube inserted into another tube or into a coupler of a suction system, operated by the compression of a number of elastic washers of rubber for instance, and of a number of metal washers held by a gland cover.

Figure 1:
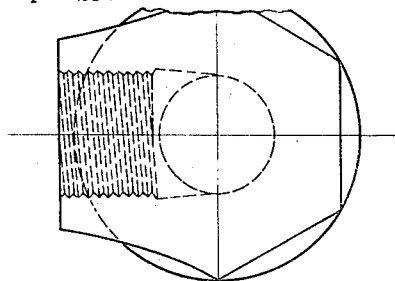
Figure 2:
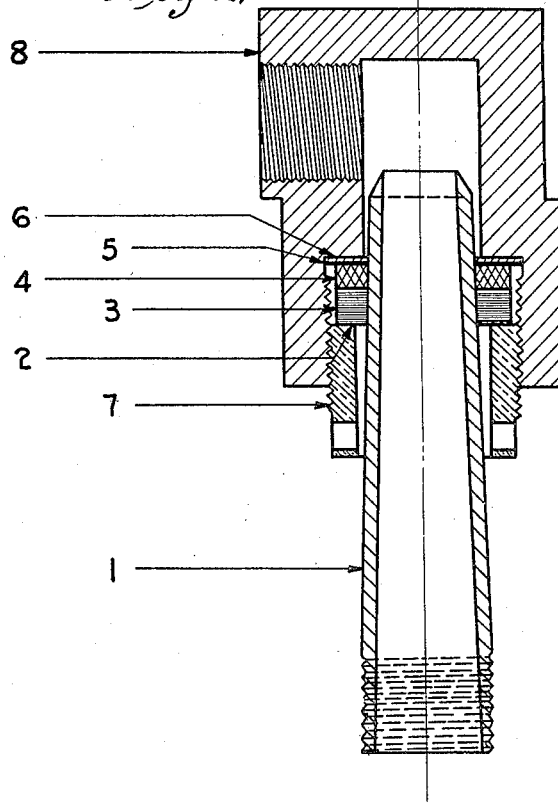

The air tight connection, which resists as much pressure as the vacuum in the tube provided with my coupling, is obtained by the construction shown in the attached drawing, in which Fig. 1 shows my coupling in a plan view, and Fig. 2 is a cross section of same.

Referring to the drawing, (1) is the tapered end of a pipe inserted into the main body of a coupler (8) which is counterbored and widened so that all the washers producing an air tight connection may be inserted into the widened interior provided with threads.

First there is a perforated washer (6) of rubber cloth, which rests against the shoulder of the widening to prevent the air from entering between the threads of gland cover; then comes a steel washer (5) to protect the rubber cloth washer (6) and provide a space between the soft metal washer (4) and said rubber cloth washer (6).

Further outside there is a pure gum gasket (3) which due to the pressure by the gland cover (7) transmitted to the exterior steel washer (2) forms an air tight seal. The gland cover (7) keeps all the washers and gasket in place, and is screwed into the widened portion of the body of coupler (8) thus forming a tube connection without the use of clamps, lever, screws or flanges.

When the gland cover (7) is screwed in, all the washers are forced together, and the pure gum gasket (3) cannot creep under the pressure nor by the suction, but is kept by the soft metal washer (4).

Having thus described my invention what I claim is:

A pipe coupling comprising a coupler having an opening therein and a threaded enlarged opening at one end provided with a shoulder; a series of rubber and steel washers in said enlarged opening; a tapered pipe in said openings of said coupler and adapted to engage said washers; and a gland cover threaded into the enlarged opening of said coupler and adapted to hold said washers in place for the purpose specified.

In testimony whereof I have affixed my signature.

JOSEPH RODNEY BROWN.